US008920585B2

(12) United States Patent
Shan et al.

(10) Patent No.: US 8,920,585 B2
(45) Date of Patent: Dec. 30, 2014

(54) ASYMMETRIC BLADDER COMPRESSION FOR ELIMINATION OF LAMINATION DEFECTS ON PROGRESSIVE ADDITION LENSES

(75) Inventors: Haifeng Shan, Shrewsbury, MA (US); Peiqi Jiang, Plano, TX (US); Steven Weber, Carrollton, TX (US)

(73) Assignee: Essilor International (Compagnie Générale d'Optique), Paris (FR)

( * ) Notice: Subject to any disclaimer, the term of this patent is extended or adjusted under 35 U.S.C. 154(b) by 105 days.

(21) Appl. No.: 13/567,534

(22) Filed: Aug. 6, 2012

(65) Prior Publication Data

US 2014/0034212 A1 Feb. 6, 2014

(51) Int. Cl.
| | | |
|---|---|---|
| B32B 41/00 | (2006.01) | |
| B29C 65/00 | (2006.01) | |
| B29C 63/16 | (2006.01) | |
| B29L 11/00 | (2006.01) | |
| B29D 11/00 | (2006.01) | |
| B29C 63/00 | (2006.01) | |
| B30B 5/02 | (2006.01) | |
| G02C 7/02 | (2006.01) | |

(52) U.S. Cl.
CPC .......... *B29C 65/00* (2013.01); *B29L 2011/0016* (2013.01); *B29C 63/16* (2013.01); *B29C 66/81455* (2013.01); *B29D 11/0073* (2013.01); *B29C 63/0073* (2013.01); *B30B 5/02* (2013.01); *G02C 7/024* (2013.01); *B29C 66/45* (2013.01)
USPC .......... 156/64; 156/212; 156/230; 264/36.17; 264/496; 264/500; 264/547; 425/43; 425/389; 425/405.1

(58) Field of Classification Search
CPC .. B29C 65/00; B29C 63/16; B29C 66/81455; B29C 63/0073; B29C 66/45; B29D 11/0073; B29L 2011/0016; G02C 7/024; B30B 5/02
USPC .......... 156/64, 212, 230; 264/36.17, 496, 500, 264/547; 425/389, 405.1, 43
See application file for complete search history.

(56) References Cited

U.S. PATENT DOCUMENTS

| | | |
|---|---|---|
| 6,562,466 B2 | 5/2003 | Jiang et al. |
| 7,854,865 B2 | 12/2010 | Chiu et al. |
| 2007/0035070 A1 | 2/2007 | Jiang et al. |

FOREIGN PATENT DOCUMENTS

| | | |
|---|---|---|
| WO | 03/004255 A2 | 1/2003 |
| WO | 2012054046 A1 | 4/2012 |

OTHER PUBLICATIONS

International Search Report, dated Oct. 22, 2013, from International Application No. PCT/EP2013/066214.
Written Opinion, dated Oct. 22, 2013, from International Application No. PCT/EP2013/066214.

*Primary Examiner* — Philip Tucker
*Assistant Examiner* — Joshel Rivera
(74) *Attorney, Agent, or Firm* — Gardere Wynne Sewell LLP

(57) ABSTRACT

A method and apparatus for elimination of lamination defects on progressive addition lenses. The lamination method uses a flexible bladder designed to apply pressure evenly across the lens surface. A spacer is positioned between a Hard Multi-Coat carrier and the flexible bladder. The spacer is located in a region of the carrier which is designated to deliver a coating to a section of the lens which is farthest from the carrier. The spacer asymmetrically increases the pressure applied to the carrier to eliminate lamination defects.

20 Claims, 4 Drawing Sheets

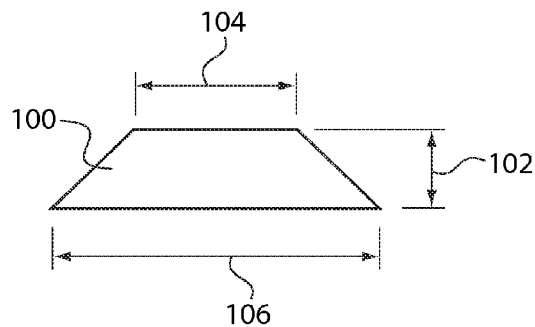
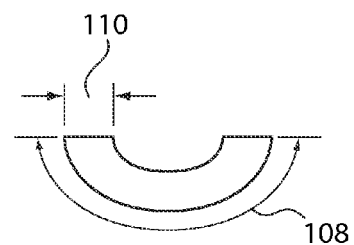
FIG. 7A                    FIG. 7B
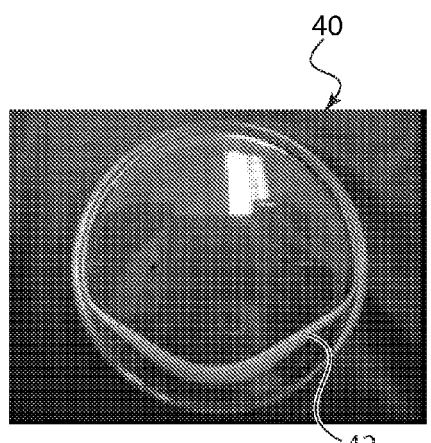
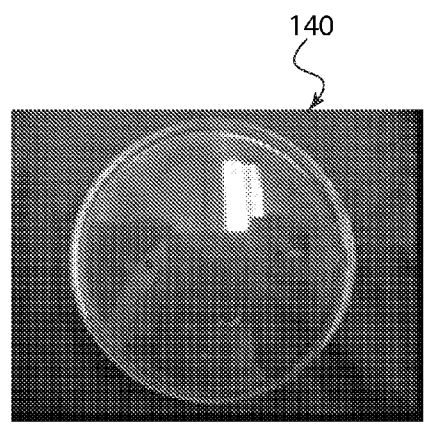
FIG. 8A                    FIG. 8B
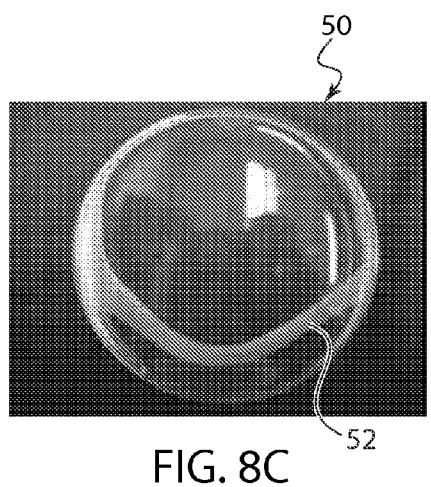
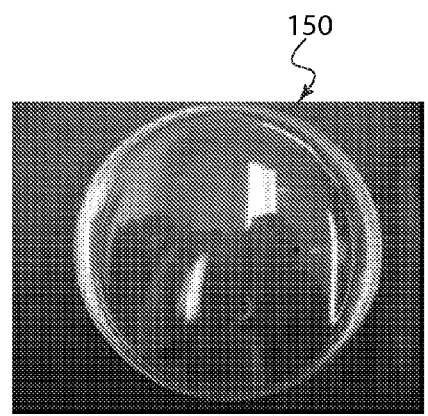
FIG. 8C                    FIG. 8D

ASYMMETRIC BLADDER COMPRESSION FOR ELIMINATION OF LAMINATION DEFECTS ON PROGRESSIVE ADDITION LENSES

BACKGROUND OF THE INVENTION

1. Field of the Invention

The invention relates to a process and apparatus for asymmetric bladder compression for elimination of lamination defects on Progressive Addition Lenses (PAL).

The invention may be applied to any type of lamination process. Most preferred are transfer processes where one or more layers to be transferred are placed on a carrier, pressure being applied to the layers by means of the carrier instead of directly.

2. The Prior Art

Plastic lenses are becoming increasingly desirable because of their low weight and thin designs. Since plastic is softer than glass, plastic lenses are coated to impart the finished lenses with additional or improved optical or mechanical properties. Thus, it is usual practice to coat at least one surface of an ophthalmic lens, typically made of an organic material, successively, starting from the surface of the lens, with an impact resistant coating (impact resistant primer), a scratch resistant coating (hard coat), an anti-reflecting coating and, optionally, a hydrophobic top coat. Other coatings such as a polarized coating, photochromic or dye coatings may also be applied onto one or both surfaces of the ophthalmic lens.

Numerous processes and methods have been proposed for coating a face of an ophthalmic lens, as described generally in U.S. Pat. No. 6,562,466. As an efficient alternative to dip coating or spin coating, the coatings are first layered on to a thin carrier and then transferred to the lens surface. One such process is the transfer process, for example, as described in the patent application WO 2003/004255, one embodiment of it being the Back-Side Transfer (BST) for which the coating is applied on the back side of the lens (concave surface).

The Back-Side Transfer (BST) lamination process is used to quickly transfer a Hard Multi-Coat (HMC) layer from an HMC carrier to an ophthalmic lens. As showed in FIG. 1, an Elastomeric Membrane Fixture (Bladder) is used for this purpose. The inflatable membrane apparatus is more fully described in WO 2003/004255. As pressure is applied to one side of the elastomeric membrane, it deforms and contacts the HMC carrier. The carrier then deforms and contacts the lens In its final position, a combination of heat and pressure fix the HMC layer to the lens, enabling a transfer of the HMC layer from the carrier to the lens. The concave side of the lens can be either toric, or spherical, or progressive in curvature. Further, the exact same process may be used to apply a HMC layer on a front side of a lens; the main differences are related to the inversion of the surface's curvature.

Progressive Addition Lenses (PAL) can be manufactured in both positive and negative powers with varying surface contours. They comprise a region designed to facilitate vision of distant objects and a near vision region wherein the power of the lens is adapted to facilitate vision of close-by objects by the wearer. Generally, the near vision zone is positioned at the bottom of the lens once it is mounted on a frame. The negative power PAL lenses have a surface depression at the near vision region. The carrier used for the transfer process does not achieve full pressure in the vicinity of the depression, resulting in a coating defect. Currently, there is no acceptable solution. Processing parameters, such as: 1) lamination pressure; 2) lamination height; 3) bladder size; and 4) bladder shape, have been tested. None of these can effectively reduce the defect. The carriers are delicate parts, typically having a thickness in the range of 1 mm or less. For example, carriers may be produced according to the method described in U.S. Pat. No. 7,854,865. As a result, if the lamination pressure is adjusted too high, there is a risk of damaging the carrier resulting in an improperly coated lens. The same issue can appear in back side transfer if the near vision zone is formed on the back side of the lens or in front side transfer if the near vision zone is partially formed by variation of the curvature of the front side of the lens.

As a result there is a need to adapt the bladder compression lamination method and apparatus to eliminate coating defects on PAL lenses.

SUMMARY OF THE INVENTION

Accordingly, it is an object of the present invention o have a better HMC (Hard multi coat) transfer process for application on ophthalmic lens. In particular it is an object of the present invention to have a better HMC (Hard multi coat) Back Side Transfer (BST) process for application on ophthalmic lens.

It is another object to use the invention for other processes, such as "polar lens by film lamination". For example, while laminating polar film onto PAL lens with non-spheric surfaces or surfaces with complex topography, the lamination being applied on the back side of the lens or on the front side. Accordingly, it is also an object of the present invention to have a better film lamination process for application on ophthalmic lenses. In cases where a lamination defect is caused by a sharp variation of curvature of the lens surface, the teachings of the present application may be applied. Particularly, a spacer may be used between the film to laminate and a pressurizer, pushing the film toward the lens, roughly overtying the position of the expected defect in order to locally apply more pressure.

These and other related objects are achieved according to the invention by a method for laminating a coating from a HMC carrier on to a multifocal lens. First, a spacer is provided with predetermined dimensions and configuration. Next, the spacer is positioned between the HMC carrier and a pressurized laminating device, such that the spacer is located on the backside of a region of the HMC carrier, which is designated to deliver a coating to a section of the lens which is farthest from the carrier. Finally, the coating is laminated on to the lens, whereby the spacer asymmetrically increases the pressure to eliminate lamination defects.

The spacer is preferably made from, but not limited to, silicone film, and wherein if multiple layers of film are provided, the bottom film layer or layers facing the carrier is wider and longer than the top layer or layers facing the pressurized laminating device so that the cross-sectional area of the spacer is larger at the bottom facing the carrier. The spacer may also be made of a single layer with a wider bottom, facing the carrier and a thinner top, facing the pressurized laminating device.

The lens includes a high side and a section of the lens includes a low side comprising a near vision zone. A theoretical spacer thickness is calculated as being equal to the difference in height between the high side and the low side of the lens. The spacer's thickness may be determined based on a combination of the theoretical spacer thickness and the thickness of available materials. A simplified spacer thickness may be calculated as being equal to a difference in height between a curvature of the low side and the carrier when the carrier first contacts the high side. It may further be approximated to a value in millimeter (mm) equal to a value of the difference in curvature, expressed in diopter, between the curvature of the near vision zone and the curvature of the carrier.

In a simplified way, for absolute base differences between the high side and the low side that are greater or equal to 2.5D (Diopter), the spacer thickness may preferably be selected between 2 mm and 3 mm inclusive; and for absolute base differences between the high side and the low side that are less than or equal to 2.5D, the spacer thickness is preferably selected between 1 mm and 2 mm inclusive.

In another simplified binary selection process, using 1.5 mm thick spacer layers, for absolute base differences between the high side and the low side that are greater or equal to 3D (Diopter), two spacers having a total thickness of 3 mm are selected; and for absolute base differences between the high side and the low side that are less than or equal to 2D, one spacer having a thickness is 1.5 mm is selected.

The two selection processes can be described generically as defining a diopter limit between 2D and 3D inclusive, and selecting a first (thick) spacer if the absolute base difference between the high side and the low side is above the diopter limit and selecting a second spacer thinner than the first spacer if the absolute base difference between the high side and the low side is below the diopter limit.

The section of the lens includes a low side where the spacer's bottom length is equal to the length of the tow side. For most PAL designs, in case of lamination or transfer process on the concave face of the lens (back side of the lens), the spacer's bottom length is approximately equal to an arc of length approximating ¼ of lens' circumference and positioned at the near vision zone. In some cases the spacer, when placed at the NRVT zone, may cover an arc greater than a Pi/2 angle. The spacer's bottom width is approximately equal to the width of the low side. In a practical embodiment, the spacer's bottom width is approximately 4 mm, for a lens with diameter of 75 mm.

The spacer may be secured to the carrier with double sided tape. Alternatively, any other means of fixation may be used, or no means of fixation. The lamination may be carried out according to a Back-Side Transfer (BST) process where the pressurized laminating device includes a bladder.

In an alternate embodiment of the invention, there is provided an apparatus for laminating a coating Or a Hard Multi-Coat (HMC) on to a multifocal lens. The apparatus comprises a lamination station in combination with a dimensioned spacer. The lamination station has a fixed platform to support a coating and a multifocal lens. In the case of an apparatus for transferring a coating, or a HMC, from the surface of a carrier on to a multifocal lens, the fixed platform is arranged to support the carrier on top of the multifocal lens. The station further includes a flexible membrane sealed along its periphery to form a closed chamber which can be pressurized to expand the flexible membrane toward the fixed platform. A gas source selectively pressurizes the closed chamber so that said flexible membrane applies variable levels of pressure within a carrier stress limit to laminate the coating on to the lens. The membrane applies pressure which is radially symmetric with respect to the carrier. A dimensioned spacer is disposed between the flexible membrane and the carrier to asymmetrically increase the pressure applied to the carrier to eliminate lamination defects without damaging the carrier.

The spacer has abuse contacting the carrier and atop, which is narrower and shorter than the base, contacting the membrane. The apparatus is further in combination with a multifocal lens having a complex topography including a high side and a tow side comprising a near vision zone. The spacer has a thickness defined as the distance calculated at the position of the near vision zone between a base with same curvature as the high side and a base with same curvature as the near vision zone of the lens, with both bases being in contact at the optical center of the lens. The spacer has a bottom width as being equal to the width of the low side. The spacer has a bottom length as being equal to the length of said low side.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views:

FIGS. 7A and 7B are schematics showing shapes and confiurations of spacers.

FIGS. 8A-8D are comparative photographs showing the elimination of lamination defects when using spacers.

DETAILED DESCRIPTION OF THE PREFERRED EMBODIMENTS

Figure 1:
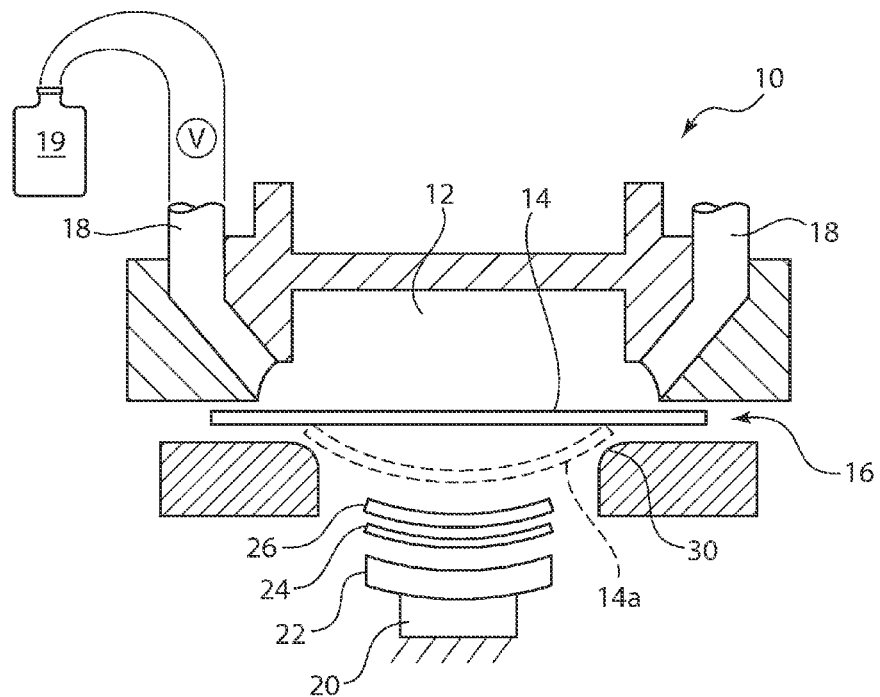
FIG. 1 is a cross-sectional view of an Elastomeric Membrane Fixture which inflates to press the carrier against the lens.

The BST lamination process is used to quickly transfer HMC an layer from an HMC carrier to the back side surface (i.e. the surface destined to face the wearer) of an ophthalmic lens. As shown in FIG. 1, an Elastomeric Membrane Fixture (Bladder) is used for this purpose. The inflatable membrane apparatus is more fully described in WO 2003/004255, the entire contents of which are incorporated herein by reference thereto. As in said patent application WO 2003/004255, the principle showed thereafter in the case of a Back-Side Transfer lamination process may be applied, mutatis murandis, to a Front Side Transfer lamination if one desires to transfer a film from a carrier on to a Front side surface (convex surface) of a multifocal lens. Further, the same principles may be used to directly laminate a film on to a surface of a lens without using a carrier. One skilled in the art will know how to remove the reference to a carrier in the following text and process directly to press the membrane on the film to be laminated.

As pressure is applied to one side of the elastomeric membrane, it deforms and contacts the HMC carrier. The carrier then deforms bringing the coating into contact with the lens. In its final position, the combination of heat and pressure fixes the HMC layer to the lens and it enables a transfer of the HMC from the carrier to the lens. The lens concave side can be either tone, or spherical, or progressive in curvature.

More particularly, FIG. 1 shows a cross-sectional view of an Elastomeric Membrane Fixture (fixture) 10 having a pressure cavity or fluid accumulator 12 with its open lower side covered by a flexible bladder or membrane 14. The round membrane 14 is secured via peripheral clamping 16. One or more fluid ports 18 are provided to place a source of pressurized fluid 19 and valve V in communication with cavity 12. When cavity 12 is pressurized, the membrane inflates to the position shown in dotted line as 14a. Membrane 14a is used to apply pressure in an even manner toward rigid block 20. Between membrane 14a and block 20, there is a lens 22, coating 24 and carrier 26. A funnel 30 is provided below the membrane 14 to define the aperture through which the membrane inflates. The funnel 30 is smoothly contoured, for example, having a radius of curvature of 80 mm. The fixture 10 and funnel 30 are designed so that the inflated membrane 14a provides radially symmetrical pressure. That is, radial lines extending from the center of the lens 22 outwards are all intended to receive similar pressure levels.

Figures 2A, 2B:
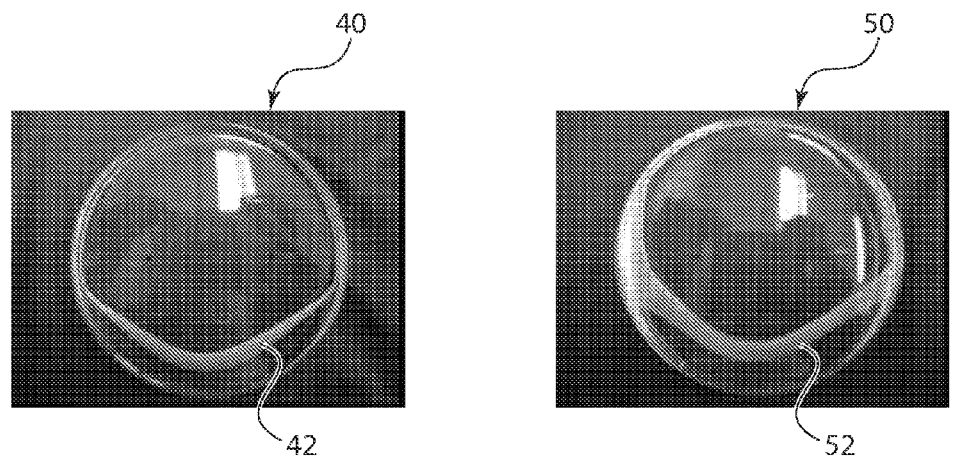
FIGS. 2A and 2B are photographs showing lamination defects on two different lenses.

The fixture 10 works well with lenses 22 that have radial symmetry and for those with minor variations in surface contour. It was noticed that for some minus progressive addition lenses (PAL), a curved white stripe defect appeared at a near vision region after the lamination process (FIGS. 2A and 2B). Such a defect is referred to as Near Vision Reduced Transfer (NVRT) defect. FIG. 2A shows a −6.0 diopter (D) spheric lens, with a −2.0 D cylinder at a 90 degree axis and a 3.0 D addition section. FIG. 2B shows a −6.0 diopter (D) spheric lens, with a 0.0 D cylinder at a 0 degree axis and a 3.0 D addition section.

In an arcuate swath across the lower portion of both lenses 40 and 50, FIGS. 2A and 2B, a Near Vision Reduced Transfer (NVRT) defect 42 and 52 are shown for two Progressive Addition Lenses (PAL) with different optical powers. It is suspected that NVRT defect was caused by a local curvature mismatch between the HMC carrier and the curvature of the concave side of the lens. A higher gap between the HMC carrier and the lens at the near vision region would cause less pressure between them. The HMC coating thus couldn't be fully transferred to the lens from the carrier due to low pressure.

Mostly, only minus Ipseo* lenses have NVRT defect, while positive power, i.e. plus and plano lenses don't have the NVRT defect, as shown in Table 1 below. Table 1 lists NVRT detects depending on the different design of PAL lenses.

tions. For example, in FIG. 3A lens 60 has 6.25D at far vision 60a, 3.5D at near vision 60b and 8.0D on the two other sides 60c, 60d. Near vision zone 60b has the lowest base. The lenses FIGS. 3A and 3B have sides that are thicker than the near and far vision regions. Accordingly, the sides are referred to as the high side.

Figure 3A:
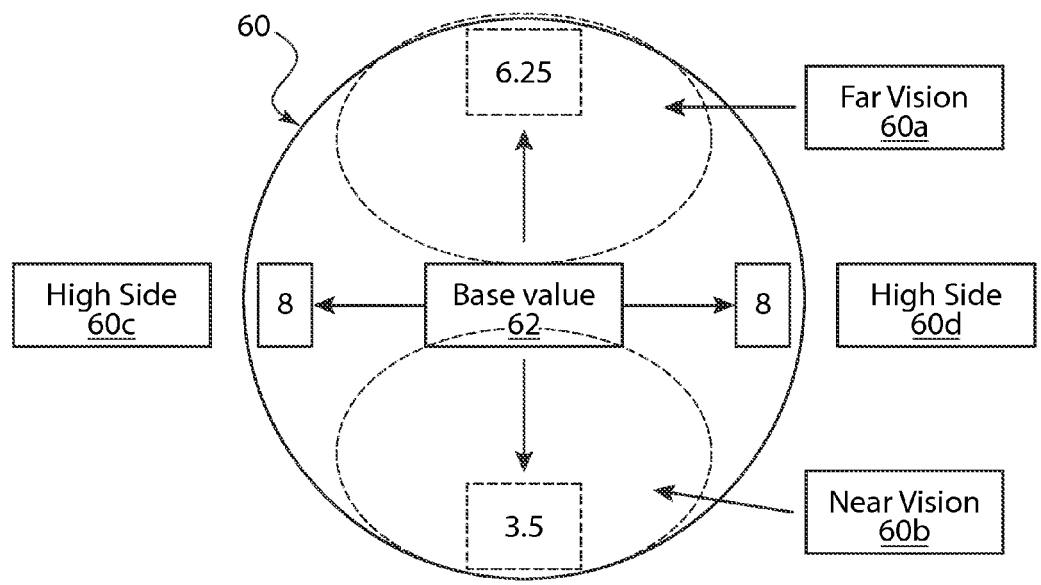
FIGS. 3A and 3B are schematics illustrating curvatures on a concave side of two different lenses.
Figure 3B:
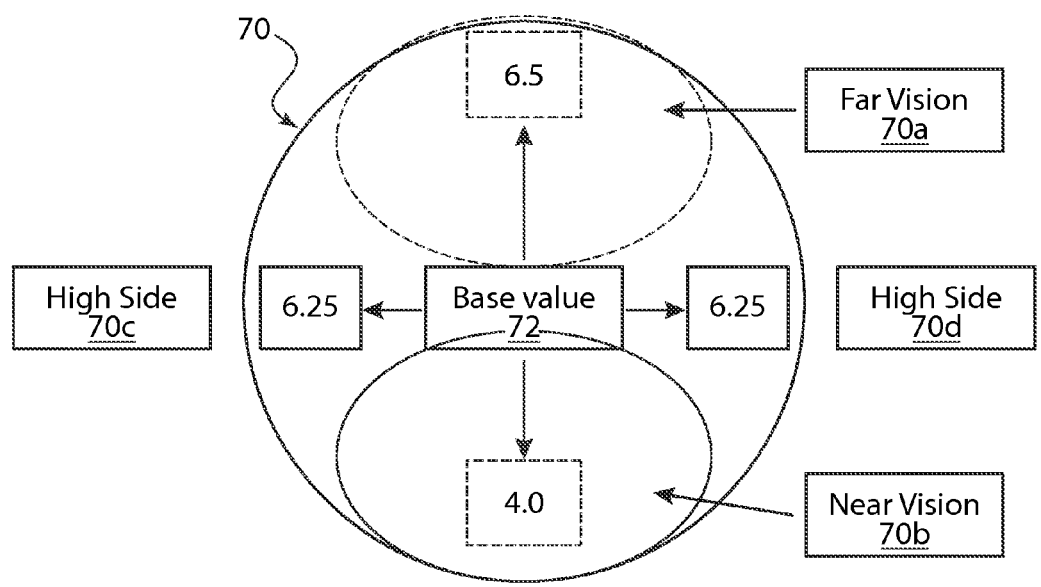

In another example, as depicted in FIG. 3B, lens 70 has 6.5D at far vision 70a, 4.0D at near vision 70b and 6.25D on the two other sides 70c, 70d. Near vision zone 70b has the lowest base.

During BST lamination process, in order to avoid any no transferred defect at lens center, the HMC carrier must be chosen with a base (curvature) higher or equal to the lens' high side's curvature. A carrier with a curvature of 8.0D needs to be chosen for lens 60 and a carrier of base 7.0D for lens 70. While there is no mismatch with respect to the sides, as the near vision zone has a very different curvature than the sides, a huge base mismatch between carrier and lens is created at lens near vision zone. For lens 60, the difference is 4.5D, while for lens 70, the difference is 3.0D.

In a first example the HMC carrier was made of polycarbonate, with tensile modulus of 2300 MPa at room temperature. The material is one that will be at solid state until it reaches its softening point, which is 140° C. Since the normal BST lamination process temperature is around 100° C., it would be hard to deform the carrier to match the lens curvature at near vision zone, where the biggest mismatch exists. Table 2 shows various information regarding the polycarbonate material used for the HMC carriers.

TABLE 2

| Modulus | Vicat softening Temp. | Tg | Grade | Manufacturer |
|---------|----------------------|------|--------------|--------------|
| 2300 MPa | 140° C. | 150° C. | Lexan OQ1030 | SABIC |

In order to check the contact between HMC carrier and lens at near vision zone, a pressure mapping test was performed

TABLE 1

| SKU | Carrier base | Base at NV | Base difference at NV | NVRT |
|-----|--------------|------------|----------------------|------|
| S: −6.0D; C: −2.0D; Axis: 90°, Addition: 3.0D | 8 | 3.5 | 4.5 | YES |
| S: −6.0D; C: −0.0D; Axis: 90°, Addition: 3.0D | 7 | 4.0 | 3 | YES |
| S: −3.0D; C: −2.0D; Axis: 90°, Addition: 3.0D | 6.5 | 3 | 3.5 | YES |
| S: −3.0D; C: −2.0D; Axis: 90°, Addition: 2.0D | 6.5 | 3.75 | 2.75 | YES |
| S: +3.0D; C: 0.0D; Axis: 0°, Addition: 3.0D | 3 | 2 | 1 | NO |
| S: +3.0D; C: −2.0D; Axis: 90°, Addition: 2.0D | 3.5 | 1.75 | 1.75 | NO |
| S: +0.0D; C: 0.0D; Axis: 0°, Addition: 2.0D | 4 | 2.75 | 1.25 | NO |

S—Spheric;
C—Cylinder;
NV—near vision;
*: Ipseo is a design of PAL lens by Essilor.

FIGS. 3A and 3B depict the curvature on the concave (Cc) side of PAL lenses. The figures demonstrates the high curvature variations that can appear on some PAL lenses. FIG. 3A is a −6.0D spherical lens 60 with −2.0D cylinder at a 90 degree axis with a 3.0D addition. FIG. 3B is a −6.0D spherical lens 70 with 0.0D cylinder at a 0 degree axis with a 3.0D addition. The numbers appearing on the lens diagrams indicates the lens base or base value 62, 72 at that location, measured by a lens clock.

As depicted, the concave (Cc) side of the lens has a complex curvature, indicated by different base at different locawith Teksan pressure sensor. The sensor was 2 inch by 2 inch, and was placed between the HMC carrier and lens, covering most near vision region. A comparative test was also performed at the same location on the same lens without HMC carrier. The lens tested was: S: −6.0D; C: −2.0D; Axis: 90°; Addition: 3.0D. The HMC carrier base curve was 8.0D. The measurement was performed at room temperature, since the pressure sensor would be damaged at a higher temperature. The lamination pressure and height were set as 30 psi and 158 mm, respectively. Table 3 shows information on the pressure sensor.

TABLE 3

| Model | Pressure range | Matrix Area | Manufacturer |
| --- | --- | --- | --- |
| 5051 | 50 PSI | 2 in. * 2 in. | Tekscan |

Figure 4A:
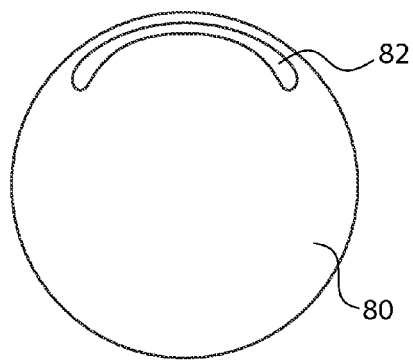
FIGS. 4A and 4B are schematics showing areas of very low pressure obtained from pressure mapping tests.
Figure 4B:
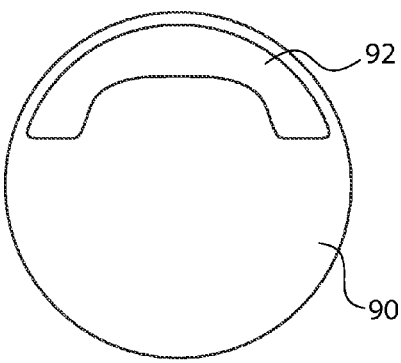

The test results are shown in FIGS. 4A and 4B, which schematically summarize results of pressure mapping conducted on the lenses. As can be seen, when there is no HMC carrier, the Elastic Membrane can make almost full contact with lens surface, by showing a minimum zero pressure area. However, when the HMC carrier is positioned between the bladder and the pressure sensor, the zero pressure area becomes much bigger, indicating a weak contact between HMC carrier and lens at the near vision region.

FIG. 4A is a diagram showing an area of extremely low pressure values (including zero values) in region 82 at the top of the lens 80 when measured without the HMC carrier. FIG. 4B is a diagram showing a larger area of extremely low pressure (including zero values) at the top of the lens 90 in region 92 when measured with an HMC carrier. Several solutions were attempted. Processing parameters, such as: 1) lamination pressure; 2) lamination height, 3) bladder size; and 4) bladder shape, were tested. None of these could effectively reduce the defect. The carriers are delicate parts, typically having a thickness in the range of 1 mm or less. As a result, if the lamination pressure is adjusted too high, there is a risk of damaging the carrier resulting in an improperly coated lens. In order to operate within a safety zone, the maximum pressure must be within a carrier stress limit. The carrier stress limit takes into account the material and thickness of the carrier along with the topological characteristics of the PAL. Accordingly, it is not a practical solution to increase the bladder pressure until the appropriate pressure is achieved in the defect area.

It was thus proposed to use a spacer on top of HMC carrier, to increase the contact between the carrier and the lens. The spacer was made of a silicone rubber membrane and had a thickness of 1.5 mm. In order to achieve better contact, two pieces of rubber spacer, with a total thickness of 3 mm, were used. The spacer was cut into a shape shown in FIG. 5 and placed at the lens near vision region, on top of HMC carrier. With the help of spacer, asymmetric compression was achieved, even though the bladder was inflated into a symmetric shape.

Figure 5:
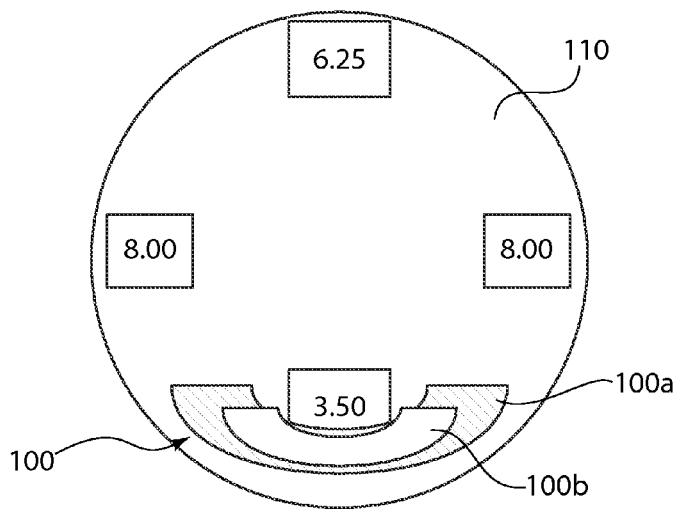
FIG. 5 is a diagram illustrating placement of the spacer relative to lens curvature.

FIG. 5 is a diagram showing placement of the rubber spacer 100 on a lens 110 with base curve values. A smaller spacer 100b is layered on top of a larger spacer 100a forming a tapered and curved spacer. The lens in the figure is a PAL lens with a −6.0D spheric base, a −2.0D cylinder at 90 degree axis and a 3.0D addition. The carrier is selected to have a curvature of 8.0D.

Figure 6A:
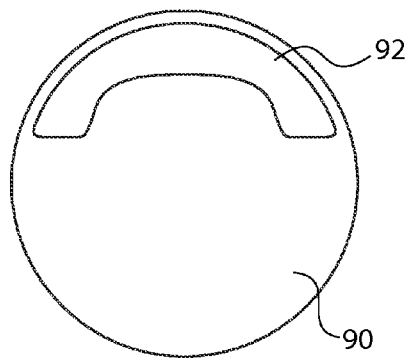
FIGS. 6A and 6B are comparative schematics showing varying levels of pressure obtained from pressure mapping tests.
Figure 6B:
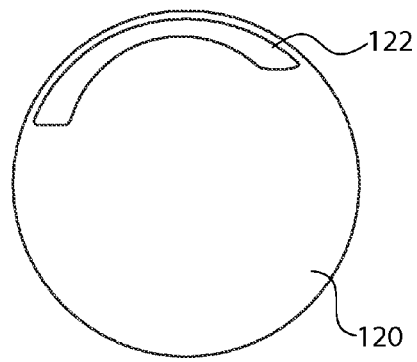

Pressure mapping was taken with Teksan pressure sensor, for lens with and without rubber spacer. A summary of the test results is shown in FIGS. 6A and 6B. The pressure sensor was placed in between the HMC carrier and the lens. As can be seen, when a spacer is present, the zero pressure zone is reduced. This proves that the rubber spacer can help compress the HMC carrier further, to have closer contact with the lens. It was noticed that there was still some zero pressure zone at near vision region. This is because the pressure mapping test was performed at room temperature, at which the HMC carrier is more rigid than in real-use condition and thus has less contact with the lens. The actual contact between the HMC carrier and the lens at lamination temperature (100° C.) will likely result in an even smaller zero-pressure-zone.

FIG. 6A shows the pressure measurements without the spacer, while FIG. 6B shows the pressure measurements with the spacer. More particularly, the lens 90 has a relatively large region 92 of low (including zero value) pressure. As can be seen, the pressure is increased in the near vision region when using the spacer. Indeed, lens 120 shows a dramatically smaller region 122 of low pressure. It should be noted that most of region 122 is located in the lens waste zone, i.e. the perimeter of the lens that will be trimmed off when the lens is shaped for frames. As stated before, the inventors believe that at working temperature, which is higher than the temperature used for the pressure measurement, "pressure at near vision" will increase even though making such measurement is difficult.

The shape and size of spacer is preferably adapted to the topology of the lens' surface.

More specifically, the primary configuration of the spacer can be defined in terms of thickness, shape, width and length.

In a first embodiment the thickness was determined as the absolute height difference between the lens high side and low side (at near vision). The bigger the difference, the higher the thickness of the spacer. So, a thickness of 3 mm was used for lenses with minus power higher or equal to −3.0 D, while a thickness of 1.5 mm was used for lenses with lower minus power (≤−2.0 D). Indeed, in this case, using spacer with bigger thickness, such as 4.5 mm, would increase the risks that the HMC carrier might crack, as the pressure might become too high locally.

The theoretical thickness of the spacer can be roughly calculated so as to be equal to the difference between the high side and the low side of the lens (if one were to trace ideal spheres with the curvature of the high side and low side respectively). The chosen thickness of spacer depends on a compromise between said theoretical thickness and the thickness of the spacer material available.

In one embodiment the shape of the spacer was designed like a wedge. In other words, the top (near the bladder) is designed to be smaller than the bottom (near the carrier). With this shape, the bladder could have smooth contact with the spacer after being inflated. If the spacer has a top length approximately equal to the bottom length (forming a rectangular shape), there will be a dead corner between the bladder and the HMC carrier. This would cause a spot on the lens where there wouldn't be any transfer pressure. The shape is preferably chosen with regard to the local slope of the surface so as to adapt to it.

The width was chosen a little bit larger (about 4 mm) than the width of NVRT.

The length was about ¼ of lens' circumference, which is roughly the size of the low side of lens.

FIG. 7A shows the spacer 100 with a thickness 102, along with the top length 104 and the bottom length 106, which is greater than the top length. FIG. 7B shows an arcuate shape with the lower, larger arc 108 generally corresponding to the lens periphery. The width 110 was chosen a little bit larger (about 4 mm) than the width of NVRT.

In a practical embodiment the spacer was constructed with two pieces of a silicone rubber membrane with 1.5 mm thickness each, for a total thickness of 3 mm. Alternatively, a unique piece of 2 to 3 mm or up to 4 or 5 mm thick spacer may be used, when lower or higher pressure respectively, is needed. However, it is necessary to practice care when using thicker spacers, since the HMC carrier might crack under pressure that exceeds the carrier stress limit.

When using two or more pieces of spacer the top pieces should be smaller than the bottom ones to help form the wedge shape. Further, the edge of the rubber spacers can advantageously be cut into a slope. With this shape, there will be a smooth contact between the bladder and the HMC carrier.

In conclusion, the thickness of the spacer is better selected by comparison with the absolute height variation on the lens, while the shape of the spacer is selected by the slope of the surface of the lens between the high side and the low side.

There is no requirement for fixing the spacer to the carrier. In one embodiment it was just laid on the carrier. And it is therefore easily re-usable for another carrier.

In a preferred embodiment the spacer is fixed on the carrier in order to simplify operation during production. Preferably, the tape or glue is removable and/or re-usable so that the spacer may be transferred easily to other carriers after use.

Thus, a double face scotch tape, such as 3M Scotch double sided tape, may be used to fix the spacer on the carrier that will be used with PAL lenses. There is no difference observed in terms of results for improving the NVRT defects appearance.

The spacer may also be fixed on the bladder. This may be advantageous when conditions or operations are known and in case a bladder or production line may be dedicated to one type of lens or at least one kind of "height difference".

This solution is not to be applied to all uses of the spacer. Indeed, one would need too many kinds of membrane, with spacer glued at different position, to manage the production of different PAL lenses. However securing the spacer to the bladder would be an efficient way to manage a lamination operation for "common height differences" or "common PAL types". In such case it would also simplify production as the spacer has only to be installed once per series of PAL lenses.

EXAMPLE

The BST lamination process was performed on two PAL lenses: 1) S: −6.0D; C: −2.0D; Axis: 90°; Addition: 3.0D; 2) S: −6.0D; C: 0.0D; Axis: 0°; Addition: 3.0D, with the conditions listed in Table 4. Rubber spacers were placed at lens near vision, as demonstrated in FIG. 5. Photographs of PAL lenses laminated with and without rubber spacer are shown in FIGS. 8A-8D. As we can see, no NVRT defects are observed on PAL lenses when using the rubber spacer. This proves that rubber spacer can efficiently help to compress the HMC carrier at near vision region, and thus eliminate the NVRT defects.

Table 4 shows the BST lamination processing condition.

TABLE 4

| Pressure | 10 Height | Lamination Time | UV Time10 | Temperatur10 e |
|---|---|---|---|---|
| 40 psi | 154 mm | 3:30 minutes | 1:00 | 100° C. |

FIG. 8 shows a series of photographs comparing lenses that were coated with and without using the spacer according to the invention. PAL lenses after BST lamination process, with and without rubber spacer.

The lenses in FIGS. 8A and 8B are −6.0D spherical lenses with −2.0D cylinder at 90 degree axis with a 3.0D addition. FIGS. 8C and 8D are −6.0D spherical lenses with 0.0D cylinder at 0 degree axis with a 3.0D addition. The top two photographs show the same lens type, where the lens 40 in FIG. 8A was coated without the spacer resulting in a NVRT defect 42. The lens 140 in FIG. 8B was coated using the spacer and no defect is visible. The bottom two photographs show the same lens (but different from the top photos). The lens 50 in FIG. 8C was coated without using the spacer resulting in NVRT defect 52. The lens 150 in FIG. 8D was coated using the spacer and no defect is visible.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the present invention. For example, the spacer may be constructed from different materials or with layers made from a combination of materials. All such changes and modifications are intended to be included within the scope of the invention as defined by the appended claims.

What is claimed is:

1. A method for laminating a coating from a Hard Multi-Coat (HMC) carrier on to a multifocal lens, the method comprising:
    providing a spacer with predetermined dimensions and configuration;
    positioning the spacer between the HMC carrier and a pressurized laminating device such that the spacer is located in a region of the HMC carrier which is designated to deliver a coating to a section of a lens that is farthest from the carrier; and
    laminating the coating on to the lens whereby the spacer asymmetrically increases pressure applied to the HMC carrier to eliminate lamination defects on the lens.

2. The method of claim 1, wherein providing the spacer comprises providing the spacer made from a silicone film, and wherein when multiple layers of the silicone film are provided, a bottom film layer facing the HMC carrier is wider and longer than a top layer facing the pressurized laminating device so that a cross-sectional area of the spacer is larger at the bottom film layer facing the HMC carrier.

3. The method of claim 1, wherein the lens includes a high side and a low side, the low side comprising a near vision zone, and wherein providing the spacer comprises calculating a theoretical spacer thickness as being equal to a difference in height between the high side and the low side of the lens.

4. The method of claim 3, wherein providing the spacer includes determining the spacer's thickness based on a combination of the theoretical spacer thickness and a thickness of available materials.

5. The method of claim 1, wherein the lens includes a high side and a low side, the low side comprising a near vision zone, and wherein providing the spacer comprises calculating a simplified spacer thickness as being equal to a difference in height between a curvature of the low side and the HMC carrier when it first contacts the high side.

6. The method of claim 1, wherein the lens includes a high side a low side, the low side comprising a near vision zone, wherein providing the spacer comprises:
    defining a diopter limit between 2D and 3D inclusive; and
    selecting one of:
        a first spacer when an absolute base difference between the high side and the low side is above the diopter limit, and
        a second spacer thinner than the first spacer when an absolute base difference between the high side and the low side is below the diopter limit.

7. The method of claim 1, wherein providing the spacer further comprises one of:
    (i) defining an upper diopter limit that is greater or equal to 3D, and selecting a spacer thickness of 3 mm when an absolute base difference between the high side and the low side is equal to the upper diopter limit; and defining a lower diopter limit that is less than or equal to 2D, and selecting a spacer thickness of 1.5 mm when an absolute base difference between the high side and the low side is equal to the lower diopter limit; and (ii) defining a diopter limit of 2.5D and selecting a spacer thickness between 2 mm and 3 mm inclusive when an absolute base difference between the high side and the low side is equal to or greater than the diopter limit and selecting a spacer thickness between 1 mm and 2 mm inclusive when an absolute base difference between the high side and the low side is less than or equal to the diopter limit.

8. The method of claim 1, wherein the section of the lens includes a low side and wherein providing the spacer comprises determining the spacer's bottom length as being equal to a length of the low side.

9. The method of claim 1, wherein the section of the lens includes a near vision zone and wherein providing the spacer comprises determining the spacer's bottom length as being an arc approximately equal to a quarter of the lens circumference and positioning the bottom length at the near vision zone.

10. The method of claim 1, wherein the section of the lens includes a low side and wherein the spacer's bottom width is approximately equal to the width of the low side.

11. The method of claim 10, wherein the spacer's bottom width is approximately 4 mm.

12. The method of claim 1, wherein positioning the spacer comprises securing the spacer to the HMC carrier.

13. The method of claim 1, wherein positioning the spacer comprises securing the spacer to the HMC carrier with double sided tape.

14. The method of claim 1, wherein laminating the coating comprises a Back-Side Transfer process, and wherein the pressurized laminating device includes a bladder.

15. An apparatus for laminating a coating from a Hard Multi-Coat carrier on to a multifocal lens comprising:

a lamination station having a fixed platform to support a carrier, a coating and a multifocal lens, and a flexible membrane sealed along its periphery to form a closed chamber that can be pressurized to expand said flexible membrane toward said fixed platform;

a gas source for selectively pressurizing said closed chamber so that said flexible membrane applies variable levels of pressure without exceeding a carrier stress limit to laminate the coating on to the multifocal lens, wherein the flexible membrane applies pressure that is radially symmetric with respect to the carrier; and a dimensioned spacer disposed between said flexible membrane and said carrier to asymmetrically increase the pressure applied to said carrier to eliminate lamination defects without damaging the carrier, wherein the dimensioned spacer has a base portion for contact with the carrier and a top that is narrower and shorter than the base portion, the top for contacting the flexible membrane.

16. A method for laminating a coating from a Hard Multi-Coat (HMC) carrier on to a multifocal lens, the method comprising:

providing a spacer with predetermined dimensions and configuration;

positioning the spacer between the HMC carrier and a pressurized laminating device, wherein said spacer is located in a region of the HMC carrier to have a base for contacting the HMC carrier and a top that is narrower and shorter than said base, the top for contacting a flexible membrane associated with the pressurized laminating device; and laminating the coating on to the multifocal lens whereby the spacer asymmetrically increases pressure applied to the HMC carrier to eliminate lamination defects on the multifocal lens.

17. The apparatus of claim 15, wherein the multifocal lens has a complex topography including a high side, and a low side comprising a near vision zone.

18. The apparatus of claim 17, wherein said dimensioned spacer has a thickness defined as a distance calculated at a position of the near vision zone between a base with a same curvature as the high side and a base with a same curvature as the near vision zone of the multifocal lens, with both bases being in contact at an optical center of the multifocal lens.

19. The apparatus of claim 17, wherein said dimensioned spacer has a bottom width equal to a width of said low side.

20. The apparatus of claim 17, wherein said dimensioned spacer has a bottom length equal to a length of said low side.

* * * * *